under 35 U.S.C. 154(b) by 0 days.

(12) United States Patent
Fujimoto (10) Patent No.: US 9,652,702 B2
(45) Date of Patent: May 16, 2017

(54) ELECTRONIC APPARATUS

(71) Applicant: CANON KABUSHIKI KAISHA, Tokyo (JP)

(72) Inventor: Kazushi Fujimoto, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/152,983

(22) Filed: May 12, 2016

(65) Prior Publication Data

US 2016/0350634 A1    Dec. 1, 2016

(30) Foreign Application Priority Data

May 29, 2015 (JP) ................................. 2015-110801

(51) Int. Cl.
| | |
|---|---|
| G06K 15/00 | (2006.01) |
| G06K 15/10 | (2006.01) |
| G06K 15/16 | (2006.01) |
| G06F 11/07 | (2006.01) |
| B41J 2/045 | (2006.01) |

(52) U.S. Cl.
CPC ........ G06K 15/408 (2013.01); G06F 11/0736 (2013.01); G06F 11/0757 (2013.01); G06K 15/102 (2013.01); G06K 15/16 (2013.01); B41J 2/04541 (2013.01)

(58) Field of Classification Search
CPC .... G06K 15/408; G06K 15/102; G06K 15/16; G06F 11/0757; G06F 11/0736; G06F 11/0739; G06F 11/076; B41J 2/04541

USPC ......................................................... 358/1.14
See application file for complete search history.

(56) References Cited

U.S. PATENT DOCUMENTS

| | | | | |
|---|---|---|---|---|
| 4,280,060 | A * | 7/1981 | Kure-Jensen | ........... F01D 17/24 290/40 R |
| 9,104,570 | B2 | 8/2015 | Bisht et al. | |
| 2014/0006912 | A1* | 1/2014 | Morikawa | ............... H04L 29/06 714/807 |
| 2015/0062614 | A1* | 3/2015 | Takatani | ............... G06K 15/408 358/1.14 |
| 2015/0199000 | A1* | 7/2015 | Kawaura | ............... G06F 1/3284 358/1.13 |

FOREIGN PATENT DOCUMENTS

| | | |
|---|---|---|
| JP | 2013-541089 A | 11/2013 |
| WO | 2012/038260 A | 3/2012 |

* cited by examiner

Primary Examiner — Allen H Nguyen
(74) Attorney, Agent, or Firm — Fitzpatrick, Cella, Harper & Scinto

(57) ABSTRACT

In an electronic apparatus in which a plurality of controller chips are cascade-connected, if an error occurs in a given chip, the present invention allows at least chips on the upstream side of the error chip to share the existence of the error chip. The electronic apparatus of this invention includes a plurality of control chips which are cascade-connected. Each control chip includes a watchdog timer, and a transfer unit configured to supply, to a second another control chip positioned on the upstream side, as an interrupt signal from the watchdog timer, an OR signal of an interrupt signal generated by the watchdog timer and an interrupt signal generated by another watchdog timer in a first another control chip positioned on the downstream side.

7 Claims, 10 Drawing Sheets

ELECTRONIC APPARATUS

BACKGROUND OF THE INVENTION

Field of the Invention

The present invention relates to an electronic apparatus in which a plurality of control chips are cascade-connected.

Description of the Related Art

As an information output apparatus for a wordprocessor, personal computer, facsimile apparatus, or the like, a printer which records information such as desired characters or images on a sheet-like recording medium such as paper or a film is widely used.

Various methods are known as a recording method of the printer. An inkjet method is recently particularly attracting attention among others because non-contact recording can be performed on a recording medium such as paper, color recording is easy, and the operation is very silent. As a configuration of this inkjet method, a serial inkjet recording apparatus is generally widely used from the viewpoints of a low cost, the ease of downsizing, and the like. This apparatus includes a recording head for discharging ink in accordance with a recording instruction, and performs recording by scanning the recording head back and forth in a direction perpendicular to the feed direction of a recording medium such as paper.

The inkjet recording apparatus as described above further increases the resolution of image recording by decreasing the ink discharge amount per dot while increasing the integration density of nozzles for discharging ink droplets. Also, various techniques have been developed to obtain a higher image quality. For example, in addition to the four basic color inks (cyan, magenta, yellow, and black), light-colored inks obtained by decreasing the dye concentrations of the four basic inks and spot color inks such as red, green, and blue are recorded at the same time.

On the other hand, the recording speed may decrease if the image quality keeps increasing. However, good results are beginning to be obtained for this problem by increasing the number of recording elements, increasing the driving frequency, adopting a recording technique such as bidirectional recording which performs recording when the recording head scans back and forth, and increasing the conveyance speed of a recording sheet.

Also, for the purpose of further increasing the speed of the inkjet recording apparatus, cases in which a system is configured by connecting a plurality of controller chips (to be simply referred to as chips hereinafter) and various processes and terminal functions are dispersed are increasing.

The system configured by connecting a plurality of chips can be obtained by preparing chips specialized in individual functions. However, there is a case in which if the system can be configured by using identical chips, this is desirable in both the development load and cost. When configuring the system by using a plurality of chips, how to share and manage errors which can occur in these chips is important. Especially when a CPU for controlling the system becomes unable to perform appropriate control, it becomes impossible to normally control the recording head and motor, and this may lead to a failure of the main body. To avoid this inconvenience, a monitoring method which monitors the CPU by using a watchdog timer and automatically resets the system if a problem arises is generally often used.

When the system is configured by a plurality of chips, however, if a CPU in a given chip becomes unable to perform proper control, how to share the state by the individual chips and how to safely stop the whole system are important. By assuming a state like this, a method of monitoring at least two microcontrollers by using one watchdog is disclosed in, for example, literature: Japanese Patent Laid-Open No. 2013-541089. The watchdog is allocated to a first microcontroller, and monitors the notification of a message from the first microcontroller within the time interval of a predetermined period. A message notified to the watchdog by the first microcontroller contains a contribution formed as a result of communication between the first microcontroller and a second microcontroller connected to the first microcontroller. In this disclosed method, the watchdog checks, based on the contribution, whether the second microcontroller is correctly operating.

In this literature, however, a configuration in which one watchdog timer monitors a plurality of controllers is possible, but whether the second controller is normally operating can be determined by only communication with the first controller. If an error occurs in the first controller, the first controller cannot communicate with the second controller any longer, so the second controller may become uncontrollable.

If the occurrence of an error can be shared in the whole system, the system can perform appropriate processing corresponding to the error. For example, if the reason for the incapability of communication is that the communication is only momentarily interrupted by the influence of static electricity or the like, it is only necessary to reestablish the communication by performing a retry operation or the like. On the other hand, if the communication is impossible because the watchdog timer operates and resets the controller, it is necessary to rapidly stop power supply to the motor, head, and the like consuming high power, and set the whole system in a safe state.

Accordingly, the system configured by using a plurality of controllers requires a technique by which if an error occurs for some reason in a specific controller and the watchdog timer operates, the whole system properly shares this information.

SUMMARY OF THE INVENTION

The present invention has been made in consideration of the above problems.

According to an aspect of the invention, there is provided an electronic apparatus comprising a plurality of control chips, where the plurality of control chips are cascade-connected, wherein each control chip comprises: a watchdog timer; and a transfer unit configured to supply, to a second another control chip positioned on an upstream side, as an interrupt signal from the watchdog timer, an OR signal of an interrupt signal generated by the watchdog timer and an interrupt signal generated by another watchdog timer in a first another control chip positioned on a downstream side.

According to the present invention, even when an error occurs in a given controller chip in an electronic apparatus in which a plurality of controller chips are cascade-connected, at least chips on the upstream side of the error chip can share the existence of the error chip.

Further features of the present invention will become apparent from the following description of exemplary embodiments (with reference to the attached drawings).

DESCRIPTION OF THE EMBODIMENTS

Embodiments according to the present invention will be explained in detail below with reference to the accompanying drawings.

Figure 1:
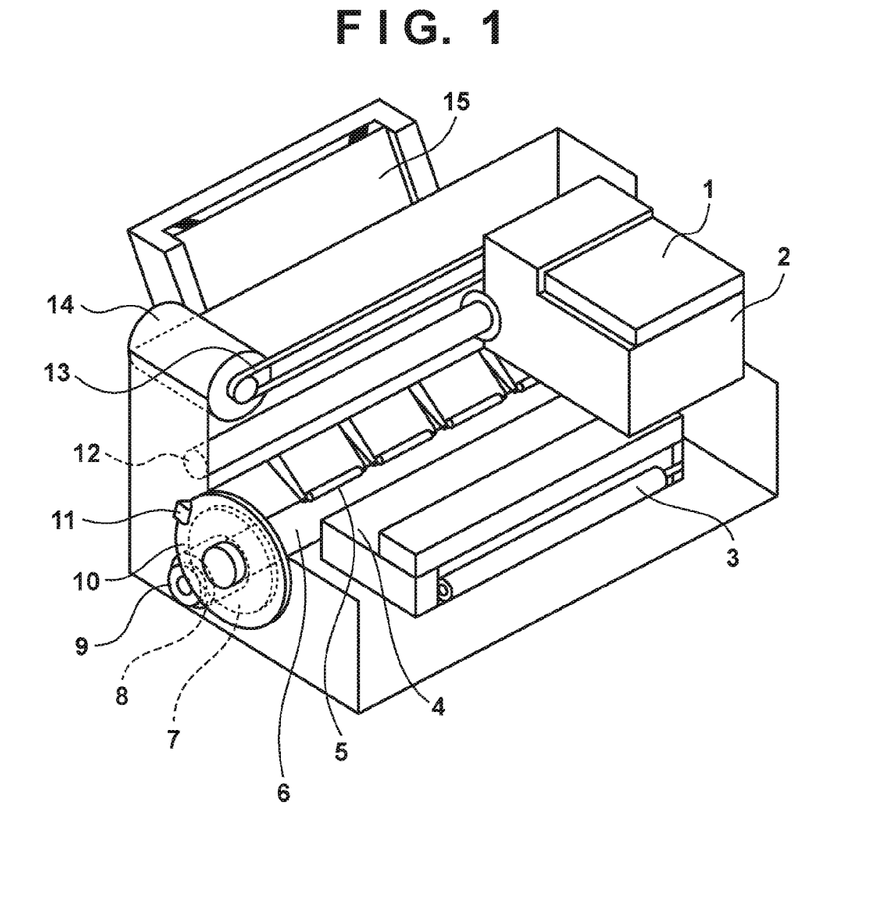
FIG. 1 is a view showing main mechanical portions of an inkjet recording apparatus.

FIG. 1 is a view showing main components of a recording apparatus as an electronic apparatus according to an embodiment. In FIG. 1, reference numeral 1 denotes a recording head having a nozzle array including a plurality of nozzles for discharging ink. Reference numeral 2 denotes a carriage on which the recording head 1 is mounted, and which scans the recording head 1 in a scanning direction perpendicular to the conveyance direction of a recording medium. Reference numeral 3 denotes a paper discharge roller to be used to convey a recorded recording medium outside the recording apparatus; and 4, a platen positioned on the bottom surface of a recording surface. Reference numeral 5 denotes a paper press roller to be used to press a recording medium 15 such as a recording sheet. Reference numeral 6 denotes a sheet conveyance roller for conveying a recording sheet. Reference numeral 7 denotes a sheet conveyance gear; and 8, a sheet conveyance motor for driving the sheet conveyance roller 6 via the sheet conveyance gear 7 and a sheet conveyance motor gear 9. Reference numeral 10 denotes an encoder film which rotates in synchronism with the sheet conveyance motor 8. A sheet conveyance encoder 11 detects a slit formed in the encoder film 10, and generates a detection signal. This signal is used to detect the position of the sheet conveyance motor, and generate a recording timing. Reference numeral 12 denotes a shaft for fixing the carriage 2; 13, a belt for fixing the carriage 2 to a part thereof, and guiding the carriage 2; and 14, a motor for rotating the belt 13.

Figure 2:
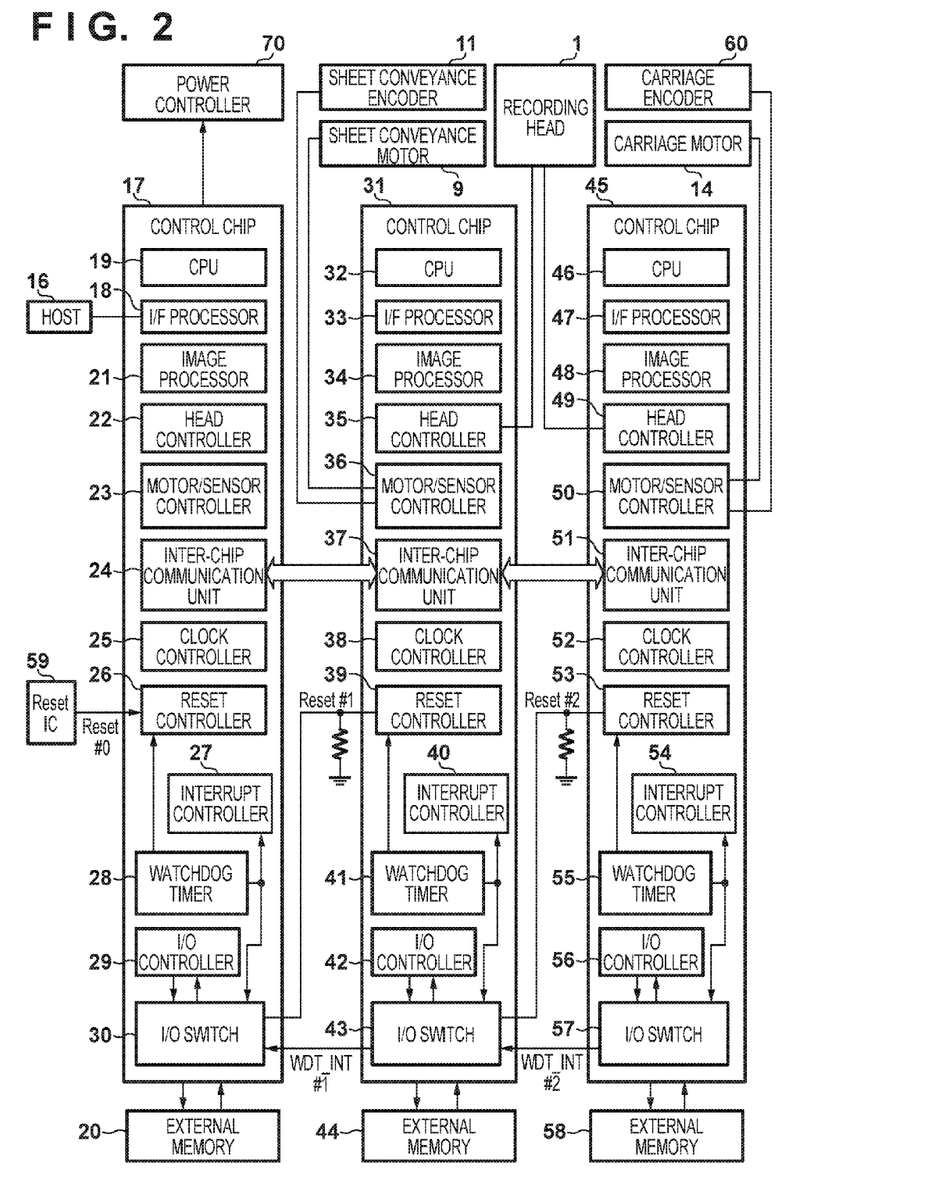
FIG. 2 is a view showing the relationship between a plurality of connected chips.

FIG. 2 is a block diagram of a controller mounted on a substrate of the recording apparatus according to the embodiment. This controller has a multichip configuration in which a plurality of (in FIG. 2, three indicated by reference numerals 17, 31, and 45) control chips (to be simply referred to as chips hereinafter) having the same configuration are cascade-connected.

A chip 17 includes a CPU 19 for executing processing in accordance with a program, an I/F processor 18 for communicating with an external device, an image processor 21 for performing a drawing process, binarization process, and the like, and a head controller 22 for controlling driving of the recording head of the printing apparatus. The chip 17 also includes a motor/sensor controller 23 for controlling the motor for conveying the recording head and recording medium, and detecting the rotational speed and position of the motor, and an inter-chip communication unit 24 for communicating with another chip. Furthermore, the chip 17 includes a clock controller 25 for generating a clock signal having a frequency necessary for each circuit, a reset controller 26 for controlling supply of a reset signal to the CPU 19, a watchdog timer 28, and an interrupt controller 27. In addition, the chip 17 includes an I/O switch 30, and an I/O controller 29 for controlling the I/O switch 30.

An external memory 20 including a ROM storing a program to be executed by the CPU 19 and a RAM to be used as a work area is connected to the chip 17. Also, a power controller 70 for controlling power supply to chips 31 and 45 and power supply to portions which consume high power, for example, the motors for driving the recording head 1 and conveying the recording head 1 and recording medium 15 is connected to the chip 17. In addition, a host 16 such as a PC as a printing data generation source is connected to the chip 17. The type of connection form does not matter, and examples are a network interface and USB interface. Moreover, a reset IC 59 for resetting the chip 17 is connected to it.

The foregoing is the explanation of the arrangement of the chip 17 and the constituent elements connected to the chip 17. The chips 31 and 45 are identical to the chip 17. Accordingly, reference numerals 32 to 43 and 46 to 57 are the same as reference numerals 18 to 30, so an explanation thereof will be omitted. As shown in FIG. 2, however, the sheet conveyance encoder 11, the sheet conveyance motor 8, the recording head 1, a carriage encoder 60, and the carriage motor 14 are connected to the chips 31 and 45. Also, ROMs forming the external memories 44 and 58 store programs specialized in the corresponding chips.

The chip 17 connected to the host 16 is reset by the signal from the reset IC 59 as described above. Chip reset of each of the second and third chips 31 and 45 connected to the chip 17 is controlled by a chip on the preceding stage (the upstream side).

The inter-chip communication units 24, 37, and 51 connect these chips, and exchange control commands and transfer data between the chips.

The chip 17 receives a control command and recording data transmitted from the host 16 via the I/F processor 18. The CPU 19 of the chip 17 analyzes the control command received from the host 16, and controls the recording apparatus in accordance with this control command. Note that programs for operating the CPU 19, various tables necessary to control a recording control circuit 23, and the like are stored in the external memory 20. The chips 31 and 45 also incorporate the CPUs 32 and 46, and programs, various tables, and the like necessary for these chips are stored in the external memories 44 and 58.

Received recording data is transmitted to the chips 31 and 45 on the succeeding stages (the downstream side) through the inter-chip communication units 24, 37, and 51. After various kinds of image processing corresponding to the recording method are performed on the recording data, the recording data is once stored in the external memories 44 and 58. Recording data for driving the recording head 1 for at least one scanning is stored in the external memories 44 and 58. Furthermore, an image mask or the like to be used to perform multi-pass recording or to perform recording by distributing recording data to two nozzles is also stored.

The CPUs 32 and 46 in the chips 31 and 45 connected to the recording head execute a printing process based on data from the chip 17. More specifically, the CPUs 32 and 46 generate image data for printing and store the data in the RAMS of the external memories 44 and 58. Also, the motor/sensor controllers 36 and 50 generate a recording timing signal based on signals from the sheet conveyance encoder 11 and carriage encoder 60. When triggered by the generation of this recording timing signal, the CPUs 32 and 46 perform the printing process by transmitting the recording data stored in the external memories 44 and 58 to the recording head 1 via the head controllers 35 and 49.

First Embodiment

A control method of the first embodiment will be explained in detail below with reference to FIGS. 2 and 3.

In the first embodiment, a system (printing apparatus) in which three chips are cascade-connected is taken as an example of the electronic apparatus. By configuring the system by using the three chips, it is possible to process the memory band, image processing function, and terminal function by distributing them. This makes it possible to improve the processability of the whole system, and increase the number of usable I/O terminals.

The first chip 17 connected to the host 16 serves as a main chip for mainly performing I/F processing, power control, and the like, that is, managing the whole system, and is reset by an external IC. The second and third chips 31 and 45 serve as sub chips for mainly performing motor/sensor control, recording head driving control, and the like. For each of the chips 31 and 45, reset control is performed by using a versatile I/O terminal of a chip positioned on the preceding stage of the chip. Since the reset control terminal is a versatile I/O terminal, the terminal is in an input state in the reset state, and switched to an output state after the system is activated. Therefore, it is necessary to fix a logic until the terminal is switched to an output state and becomes capable of control, and the logic is fixed by preparing an external resistor. Also, the logic to be fixed is a logic by which when the chip is in the reset state, a counter chip to which the reset signal is connected is reset. In this configuration, when the second chip 31 is reset, for example, the third chip 45 whose reset is controlled by the second chip is also automatically reset.

Figure 3:
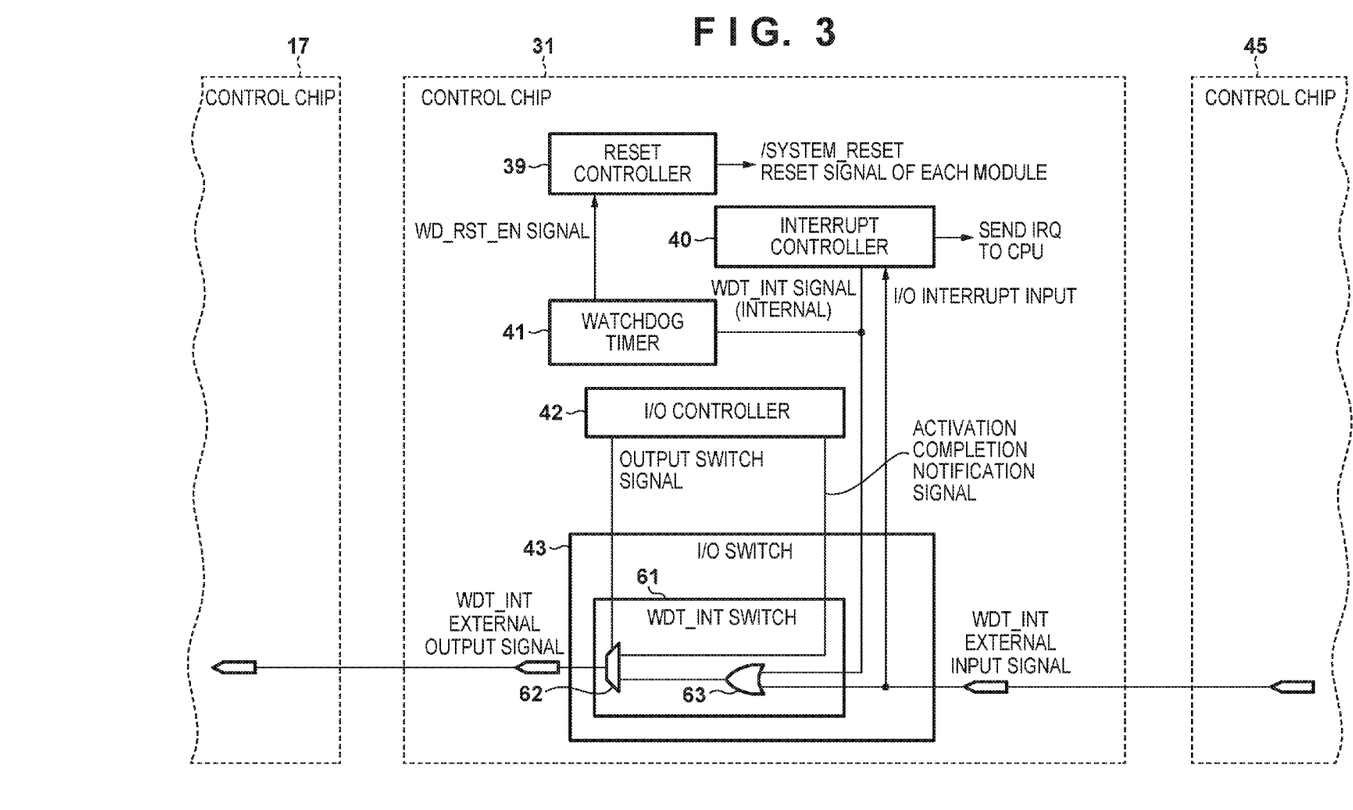
FIG. 3 is a view showing a WDT_INT switch and its periphery of a control chip.

FIG. 3 shows an arrangement around a watchdog timer 41 of the chip 31, and a connection example of the chips 17 and 45. The watchdog timer 41 has a function of outputting a WDT_INT signal when the watchdog timer function detects an error. A WDT_INT switch 61 includes a logic circuit 63. The logic circuit 63 has an OR gate which ORs the WDT_INT signal generated by the watchdog timer 41 of its own chip, and a WDT_INT external input signal which is output from the chip 45 connected as a succeeding stage and input to the control chip 31. Then, the logic circuit 63 outputs the OR signal as a WDT_INT external output signal to the controller chip 17. Thus, the logic circuit 63 can supply the watchdog timer interrupt signal WDT_INT generated in a controller chip positioned on the downstream side to the first controller chip (on the most upstream side) without any firmware. That is, the WDT_INT switch 61 functions as a transfer unit which transfers interrupt signals from the watchdog timers of its own chip and a chip on the downstream side to a chip on the upstream side. Also, an interrupt controller 40 functions as a notifying unit which, when receiving the WDT_INT signal from a controller chip on the succeeding stage, notifies the CPU of its own chip of the reception of the signal. More specifically, when receiving the WDT_INT signal from a controller chip on the succeeding stage, the interrupt controller 40 supplies an interrupt signal to the CPU.

This WDT_INT signal to be output to a counter chip and an activation completion notification signal generated by an I/O controller 42 share an I/O terminal in a selector 62 of the WDT_INT switch 61. When the power supply of each control chip is turned on and activation is complete, the CPU controls this signal and uses it as a signal indicating the activation state of the control chip. After activation is complete, however, the CPU switches the signal to a signal which transfers the watchdog timer interrupt signal. Therefore, the error state of another control chip can be shared without newly preparing any other signal in order to implement the function of this embodiment.

Figure 4:
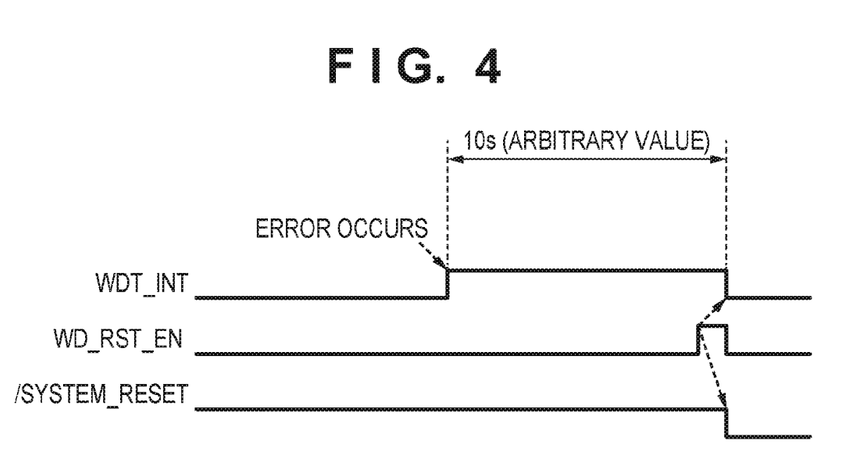
FIG. 4 is a view showing the relationship between a watchdog interrupt signal and reset signal.

FIG. 4 is a timing chart from the detection of an error by the function of the watchdog timer to actual system reset. When an error is actually detected, the WDT_INT signal output from the watchdog timer 41 is asserted. In this embodiment, the system is not immediately reset in this stage. That is, a predetermined time is inserted after the WDT_INT signal is asserted and before a control signal WD_RST_EN for causing a reset controller 39 to execute a reset process of each module is asserted. This time may also be appropriately set from an external device. By using this time, chips positioned before the error chip share the occurrence of the error. As an example, FIG. 4 shows a timing chart in which reset is performed ten seconds after the WDT_INT signal is asserted after the occurrence of an error. With this time, it is well possible to share the error state with a counter chip by using WDT_INT to be output outside.

Figure 5:
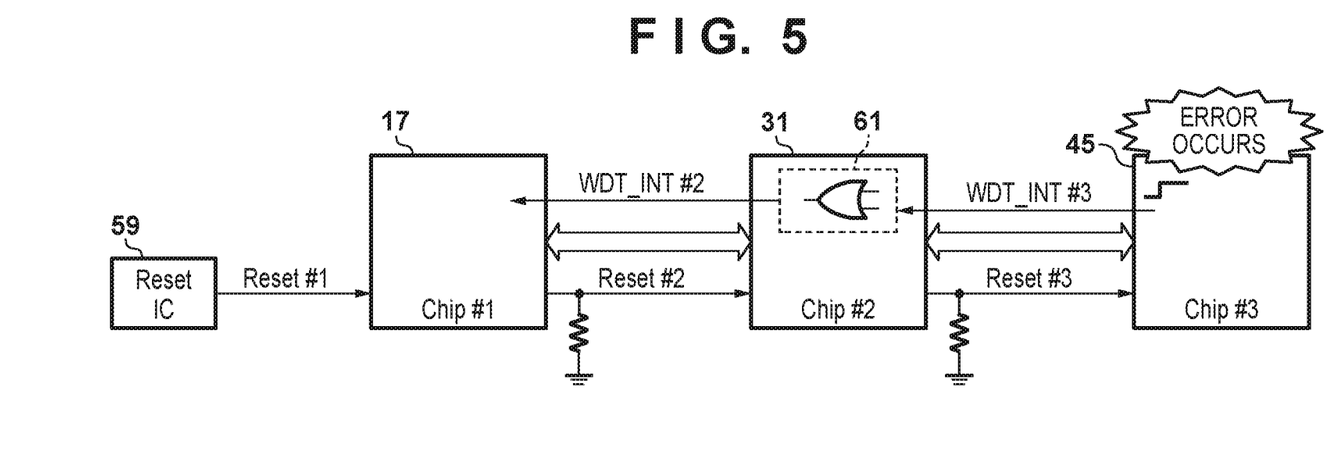
FIG. 5 is a view showing an arrangement for signal transfer when an error occurs in a third control chip.
Figure 6:
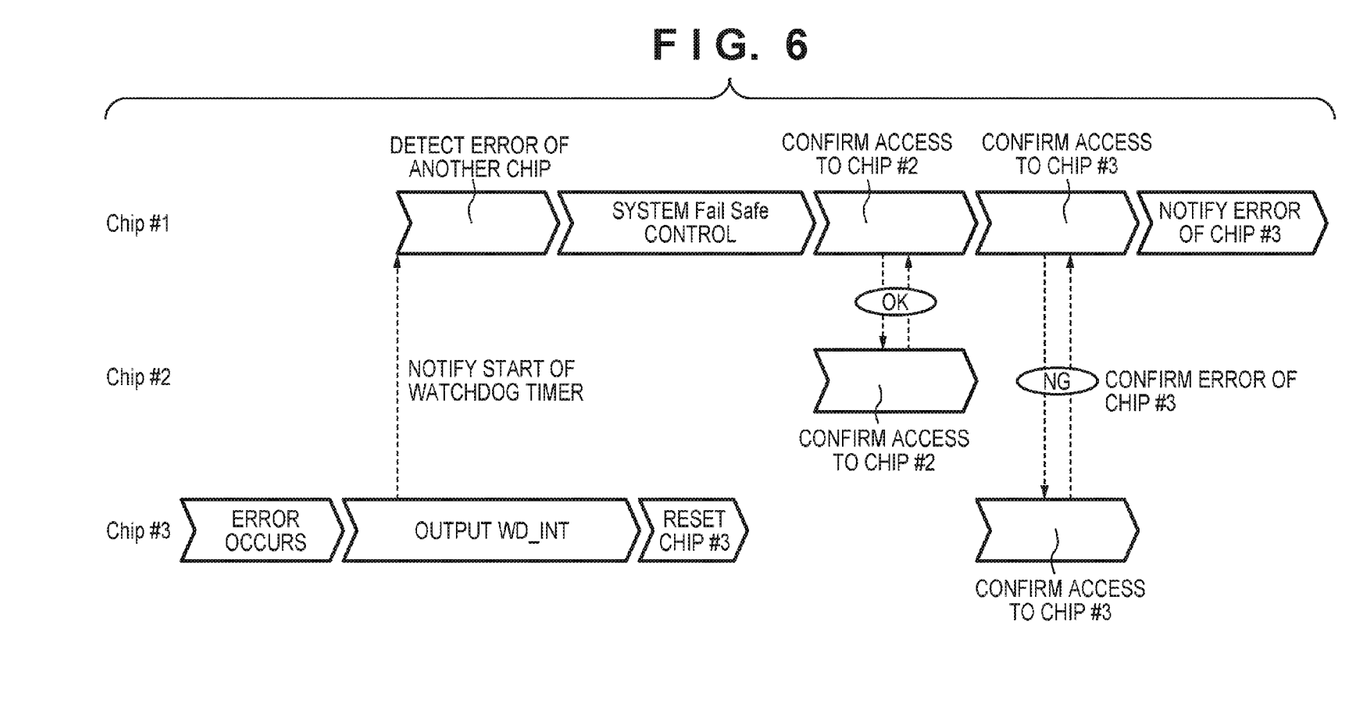
FIG. 6 is a view showing a procedure when an error occurs in the third control chip.

An example of a case in which an error occurs in the third chip 45 and the watchdog timer operates will be explained below with reference to FIG. 5 showing a practical configuration and FIG. 6 showing the procedure. When the watchdog timer operates in the third chip 45, a WDT_INT #3 signal passes through the logic circuit of the WDT_INT switch 61 of the second chip 31, and reaches the first chip 17. As a consequence, the first chip 17 managing the whole system can recognize that the error has occurred in the second or subsequent chip. In parallel to this, the third chip 45 is entirely reset by the watchdog function after the elapse of an appropriate time (in this embodiment, ten seconds). In response to the reception of the watchdog timer interrupt signal WDT_INT from the succeeding chip, the first chip 17 controls the power controller 70, thereby stopping power supply to the motor, head, and the like consuming high power. The timing at which this power supply control process is started is sufficiently earlier than the reset timing of the third chip 45. That is, the whole system can be shifted to a safe state before the third chip 45 is reset. After performing the control, the chip 17 can recognize the error chip by sequentially accessing succeeding chips. When all chips become normal, the chip 17 performs power supply by controlling the power controller 70, and returns to the printable state again.

Second Embodiment

Figure 7:
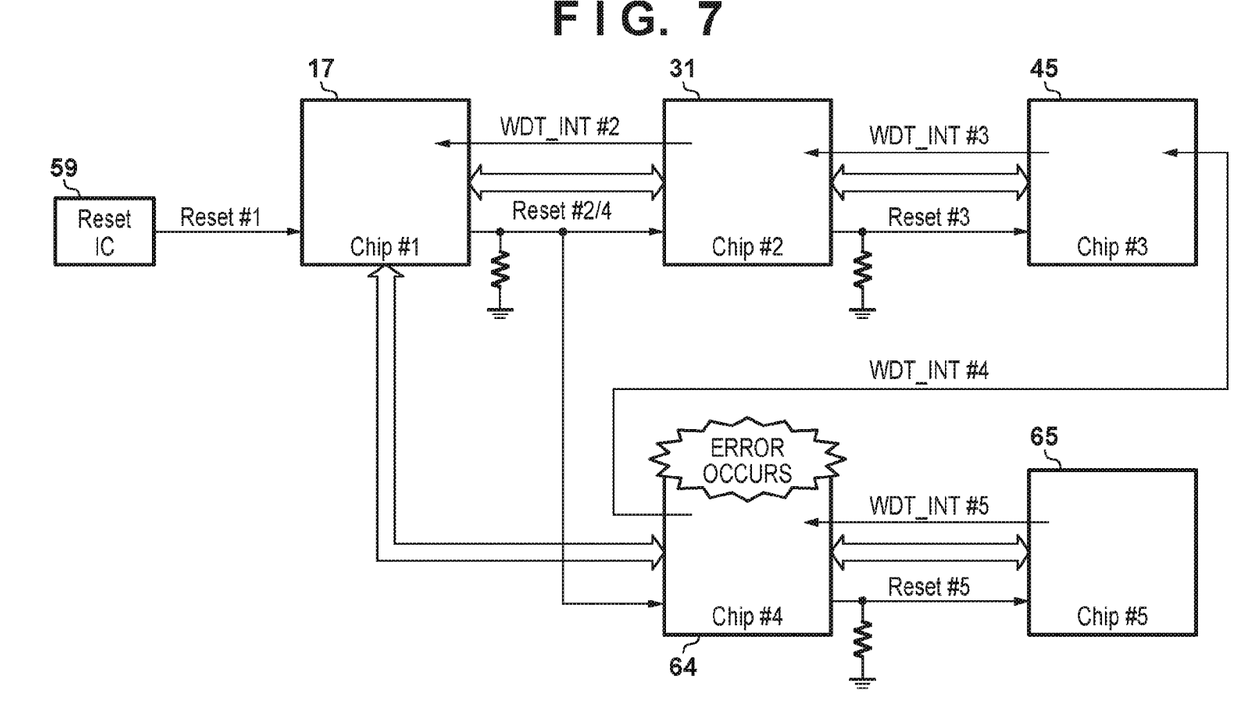
FIG. 7 is a view showing the configuration of a system according to the second embodiment.
Figure 8:
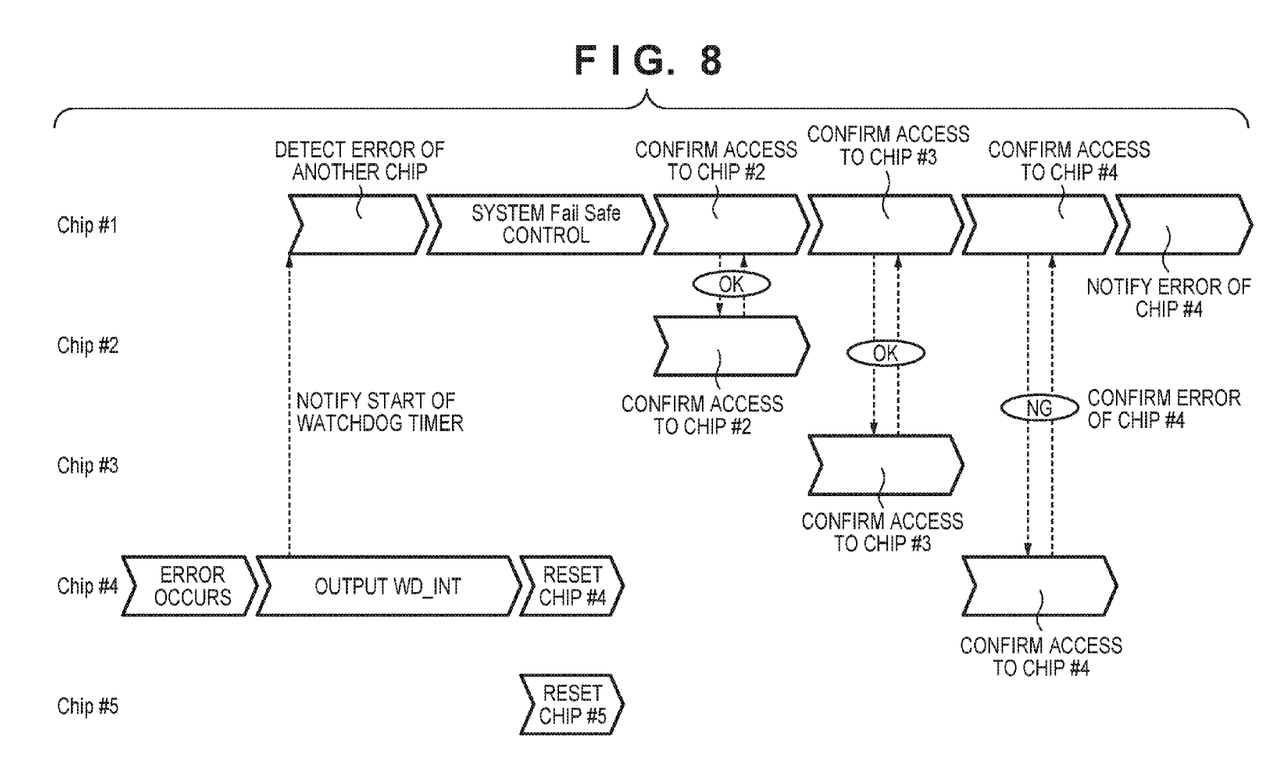
FIG. 8 is a view showing a procedure when an error occurs in the second embodiment.

In the second embodiment, a configuration in which two chips are connected in parallel to the most upstream chip and another chip is further cascade-connected to each chip is taken as an example. Also, in the second embodiment, a case in which an error occurs in the fourth chip and the watchdog timer operates is taken as an example. FIG. 7 shows a practical arrangement of the recording apparatus. The second embodiment will be explained below with reference to FIG. 8 showing a procedure.

When the watchdog timer detects an error in a fourth chip 64, a WDT_INT #4 signal reaches the first chip 17 through the logic circuits in the WDT_INT switches of the chips 45 and 31. After that, the first chip 17 managing the whole system recognizes that the error has occurred in the second or subsequent chip. In parallel to this, the chip 64 is entirely reset by the watchdog function. In addition, a chip 65 for which the chip 64 performs reset control is also reset, so the chips 64 and 65 can be changed to a safe state. As in the first embodiment, in response to the reception of the watchdog timer interrupt signal WDT_INT from the succeeding chip, the first chip 17 controls the power controller 70, thereby stopping power supply to the motor, head, and the like consuming high power. Consequently, the whole system can be shifted to a safe state. After that, the chip 17 can recognize the error chip by sequentially accessing the succeeding chips.

In the second embodiment, access up to the chip 45 can be confirmed, but the chip 64 cannot correctly be accessed because the chip 64 is reset to the initial state. Accordingly, the occurrence of the error in the chip 64 can be confirmed.

Third Embodiment

Figure 9:
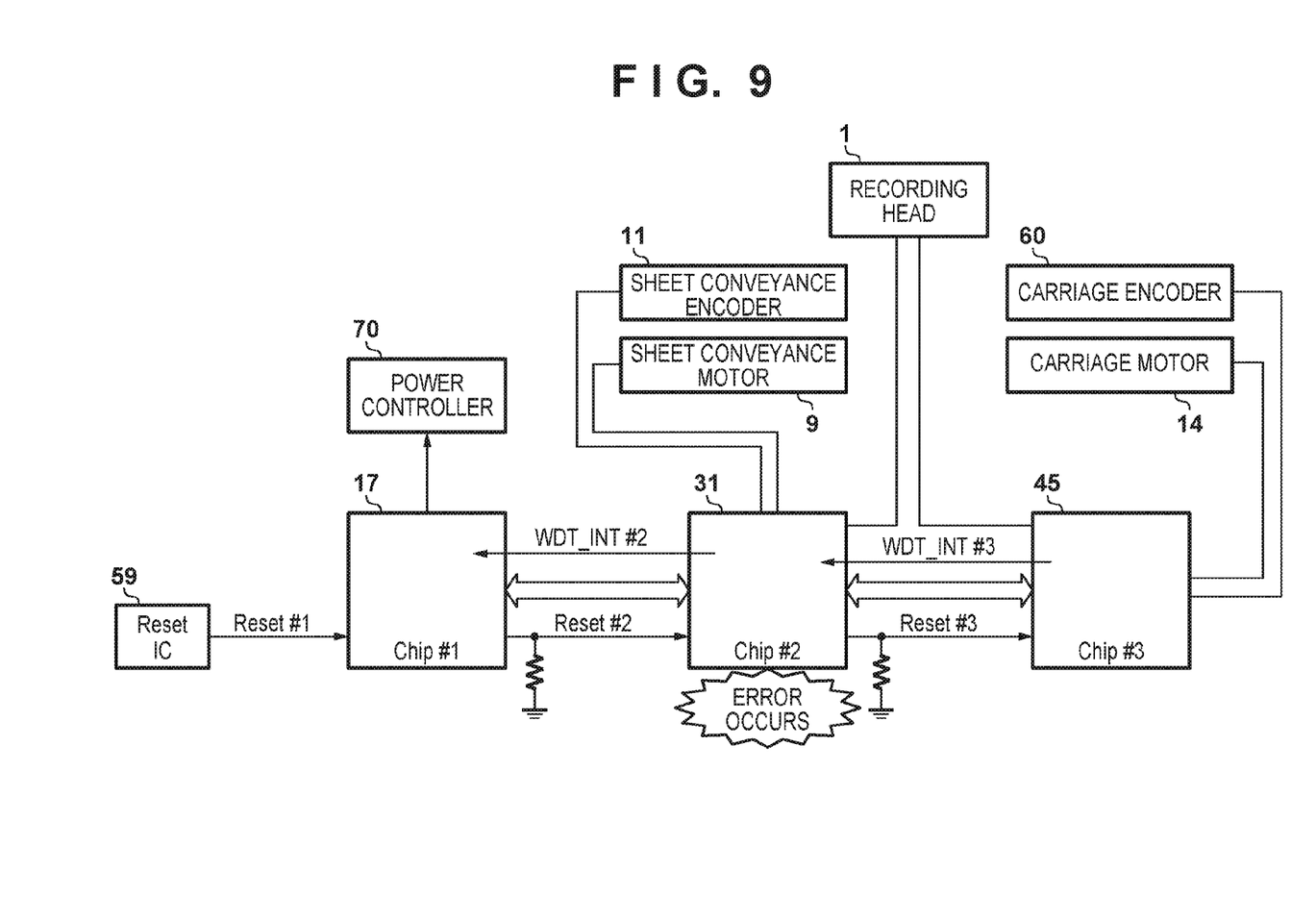
FIG. 9 is a view showing a system configuration according to the third embodiment.

In the third embodiment, a case in which the watchdog timer operates in the second chip in a system in which three chips are cascade-connected is taken as an example. FIG. 9 shows a practical arrangement. In the third embodiment, a case in which motor/encoder control and head control necessary for a recording operation are distributed to the chips 31 and 45 is taken as an example. In this arrangement, the processing of the whole system can be distributed, so the recording operation can be performed at a higher speed.

In a normal recording operation, recording is performed on a recording medium by operating the motor, encoder, head, and the like of the recording apparatus based on data input to the chip 17. However, if an error occurs and the watchdog timer operates during the recording operation, the sheet conveyance motor 9 conveying a sheet and the carriage motor 14 controlling the operation of the recording head stop. Also, the encoder to be used to detect the position of each motor stops. Therefore, a sheet currently being recorded also stops in an unintended state, so a problem may arise when the system recovers.

When the watchdog timer operates in the chip 17 controlling the whole system, the whole system can be reactivated, so the mechanism is also initialized, and the sheet currently being recorded is normally processed. However, if an error occurs in the second chip 31 and the watchdog timer operates as in the third embodiment, the procedure of a reactivation process after that must correctly be performed. More specifically, it is necessary to retract the recording head stopped during the operation, and forcedly discharge the recording sheet.

Figure 10:
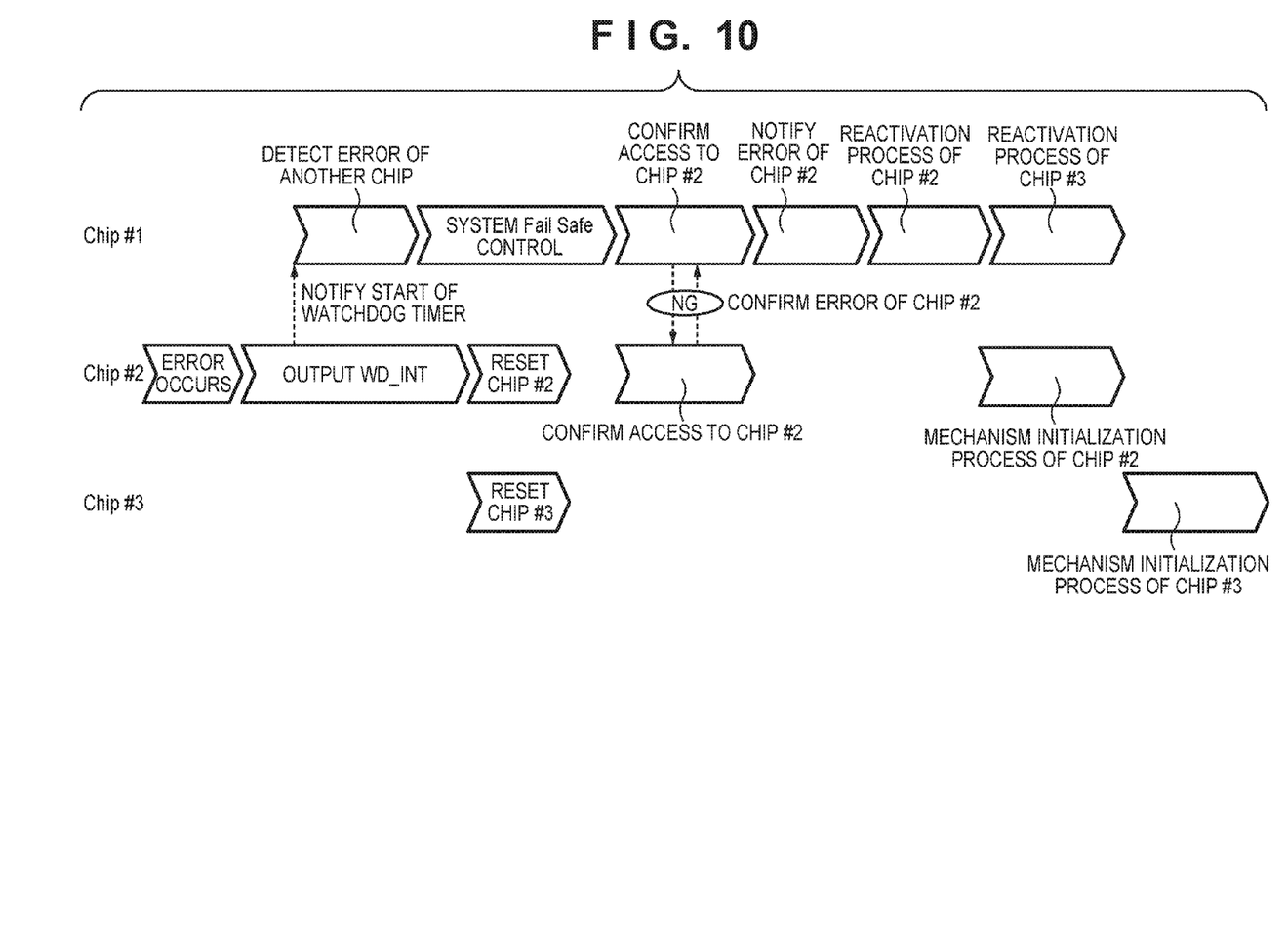
FIG. 10 is a view showing a procedure when an error occurs in the third embodiment.

The third embodiment will be explained below with reference to FIG. 10 showing the procedure. When the watchdog timer detects an error in the second chip 31, a WDT_INT #2 signal is output to the first chip 17. After that, the first chip 17 managing the whole system recognizes that the error has occurred in the second or subsequent chip. In parallel to this, the chip 31 is entirely reset by the watchdog function after the elapse of a predetermined time. In addition, the chip 45 for which the chip 31 performs reset control is also reset, so the chips 31 and 45 can be changed to a safe state. The chip 17 is the same as that in the first embodiment. That is, after receiving the watchdog interrupt signal WDT_INT from the succeeding chip, the chip 17 first temporarily stops power supply to the motor, head, and the like consuming high power by controlling the power controller 70, thereby shifting the whole system to a safe state. Then, the chip 17 recognizes that the error has occurred in the second chip 31 by sequentially accessing the succeeding chips.

After detecting the error in the second chip 31, the chip 17 performs a reactivation process on the chip 31 if the system has no problem. After becoming able to communicate with the chip 31, the chip 17 performs a reactivation process on the third chip 45, and performs a mechanism initialization process on the second chip 31 in parallel. Also, the chip 17 similarly performs a mechanism initialization process on the chip 45 after the chip 45 becomes communicable. Since the system has a configuration like this, if an error occurs in a chip controlling the motor, sensor, and recording head and reactivation of the chip is necessary, at least chips in the preceding stages of the error chip can share the error state. Therefore, the state of the recording apparatus can be changed to a safer state by, for example, retracting the printing head and recording sheet in accordance with the state of the apparatus when the error has occurred.

In this embodiment as has been described above, in a system configured by connecting a plurality of chips, the state of an error having occurred in a given chip can be notified to the most upstream chip without intervention by the CPU, so the error state can be shared. Also, since the system has the arrangement which resets downstream chips including the error chip, it is possible to safely stop or reactivate the whole system regardless of the error chip. In addition, since the activation completion notification signal and function are shared, the abovementioned function can be implemented without preparing any new dedicated terminal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110801, filed May 29, 2015, which is hereby incorporated by reference herein in its entirety.

What is claimed is:

1. An electronic apparatus comprising a plurality of control chips, where the plurality of control chips are cascade-connected,
wherein each control chip comprises:
a watchdog timer; and
a transfer unit configured to supply, to a second another control chip positioned on an upstream side, as an interrupt signal from the watchdog timer, an OR signal of an interrupt signal generated by the watchdog timer and an interrupt signal generated by another watchdog timer in a first another control chip positioned on a downstream side.

2. The apparatus according to claim 1, wherein if the watchdog timer of each of the control chip generates an interrupt signal, each control chip resets itself and a control chip positioned on the downstream side.

3. The apparatus according to claim 1, wherein each control chip comprises a reset controller configured to, when the watchdog timer of each of the control chip generates an interrupt signal, reset each of the control chip after an elapse of a preset time.

4. The apparatus according to claim 1, wherein each control chip comprises a notifying unit configured to, when receiving an interrupt signal from a control chip on the downstream side, notify a CPU of each of the control chip of the reception of the interrupt signal.

5. The apparatus according to claim 1, wherein each control chip comprises a communication unit configured to communicate with another control chip.

6. The apparatus according to claim 1, wherein a control chip positioned on a most upstream side performs a process of receiving printing data from an external device, and at least one control chip positioned on the downstream side performs a printing process based on the printing data received via the communication unit.

7. The apparatus according to claim 6, wherein when receiving an interrupt signal from the control chip on the downstream side, the control chip on the most upstream side stops power supply for driving a head and a motor participating in printing.

* * * * *